United States Patent
Wijnen et al.

(10) Patent No.: US 6,904,153 B1
(45) Date of Patent: Jun. 7, 2005

(54) ANTI-COPYING SYSTEM FOR AUDIO SIGNALS

(75) Inventors: Arie M. Wijnen, Athens (GR); Spiro J. Pandelidis, Athens (GR)

(73) Assignee: Spiro J. Pandelidis High Tech Applications, Athens (GR)

( * ) Notice: Subject to any disclaimer, the term of this patent is extended or adjusted under 35 U.S.C. 154(b) by 0 days.

(21) Appl. No.: 09/106,858

(22) Filed: Jun. 30, 1998

(30) Foreign Application Priority Data

May 4, 1998 (EP) .......................................... 98201432

(51) Int. Cl.[7] ................................................ H04B 1/00
(52) U.S. Cl. ......................... 381/119; 380/201; 360/60; 381/56
(58) Field of Search ............................. 380/201, 203, 380/236, 237, 238; 705/51, 57; 713/193; 381/119, 56; 360/60, 237, 15, 27

(56) References Cited

U.S. PATENT DOCUMENTS 4,644,422 A  *  2/1987  Bedini ......................... 360/60
4,802,212 A      1/1989  Freeman et al.
5,394,274 A  *  2/1995  Kahn .......................... 360/27

FOREIGN PATENT DOCUMENTS

| EP | 0 298 691 | 1/1989 |
| EP | 0 372 601 | 6/1990 |
| EP | 0 392 612 | 10/1990 |
| EP | 0 348 570 | 1/1991 |

* cited by examiner

*Primary Examiner*—Xu Mei
*Assistant Examiner*—Con P. Tran
(74) *Attorney, Agent, or Firm*—Oblon, Spivak, McClelland, Maier & Neustadt, P.C.

(57) ABSTRACT

In order to protect audio signals against copying, it is proposed to mix the audio signal with at least one non-audible disturbance signal. A first disturbance signal may be a low-frequency signal which is added to the audio signal, while a second disturbance signal may be a high-frequency disturbance signal which is multiplied with the audio signal. Additionally, the second disturbance signal may be modulated by a modulating signal comprising either the original or inverted original signal, or spoken messages indicative of an illegal copy.

2 Claims, 5 Drawing Sheets

ANTI-COPYING SYSTEM FOR AUDIO SIGNALS

BACKGROUND OF THE INVENTION

The present invention relates to an anti-copying system for audio signals, in particular digital audio signals.

Present day digital techniques allow perfect copies of audio signals to be made. For example, the digital audio information of a compact disc (CD) can be digitally registered on tape or can even be used to physically reproduce the CD by means of a so-called CD burner (recorder for compact discs). The possibility of digital copying, producing perfect copies of the original, has resulted in many illegal copies of CDs or other information carriers being made. This in turn leads to a substantial loss in copyright royalties. For this reason, there is a need for protection against copying of audio signals.

SUMMARY OF THE INVENTION

It is an object of the present invention to provide a method for protecting audio signals against unauthorized copying.

Accordingly, the present invention provides a method of protecting an audio signal against copying, the method comprising the step of mixing the audio signal with at least one non-audible disturbance signal.

By mixing the audio signal with a non-audible disturbance signal, that is an additional signal having a frequency lying outside the normal audible range, it is possible to obtain a combined audio signal which is, when replayed as it is, effectively undisturbed but which shows audible disturbances when copied.

Advantageously, a first disturbance signal is a low-frequency signal which is added to the audio signal. When the original audio signal and the low-frequency first disturbance signal have comparable amplitudes, the resulting mixed output signal will be highly resistant against copying to an analogue tape recorder. This aspect of the present invention is based on the insight that slowly varying signals cause the magnetic heads of a tape recorder to effectively erase the recorded signal, or at least to suppress the recording of the signal.

Preferably, the low-frequency disturbance signal has a frequency of approximately 2 Hz, advantageously between 0.5 and 3 Hz, and has a substantially sinusoidal shape. These low frequencies are not audible, nor can they be reproduced by regular audio sets, yet they have the above-mentioned erasing effect.

Advantageously, a second disturbance signal is a high-frequency signal which is multiplied with the audio signal. This may effectively result in the original audio signal being substantially interrupted ("chopped") at a high interruption frequency. Although this regular interruption is normally not audible due to the high (non-audible) frequency involved, copying of the signal will result in an incomplete demodulation of the combined signal due to the characteristics of the copying devices.

Preferably, the high-frequency disturbance signal has a frequency of approximately 20 kHz, and has a substantially sinusoidal shape, although other shapes such as block pulses are also possible.

Preferably, both the first, low-frequency disturbance signal and the second, high-frequency disturbance signal are mixed with the original audio signal to produce a combined, copy-protected audio signal.

Advantageously, the audio signal is a digital signal representation involving a sampling frequency, and the second disturbance signal has a frequency which varies in time, preferably from approximately half to approximately three quarters of the sampling frequency. This results in a second disturbance signal having both a varying (preferably increasing) frequency and, due to the aliasing effects involved, a varying (preferably decreasing) amplitude. This results in a clearly audible amplitude modulation in the copied signal.

The second disturbance signal may also be frequency and/or amplitude modulated by auxiliary modulating signals, e.g. derived from the original audio signal.

The invention further provides a device for protecting audio signals against copying, comprising signal generation means for generating at least one non-audible disturbance signal, mixing means for mixing at least one disturbance signal with the audio signal, and output means for outputting the resulting mixed audio signal.

BRIEF DESCRIPTION OF THE DRAWINGS

The present invention will be further explained with reference to the accompanying drawings, in which.

DETAILED DESCRIPTION OF EXEMPLARY EMBODIMENTS

Figure 1:
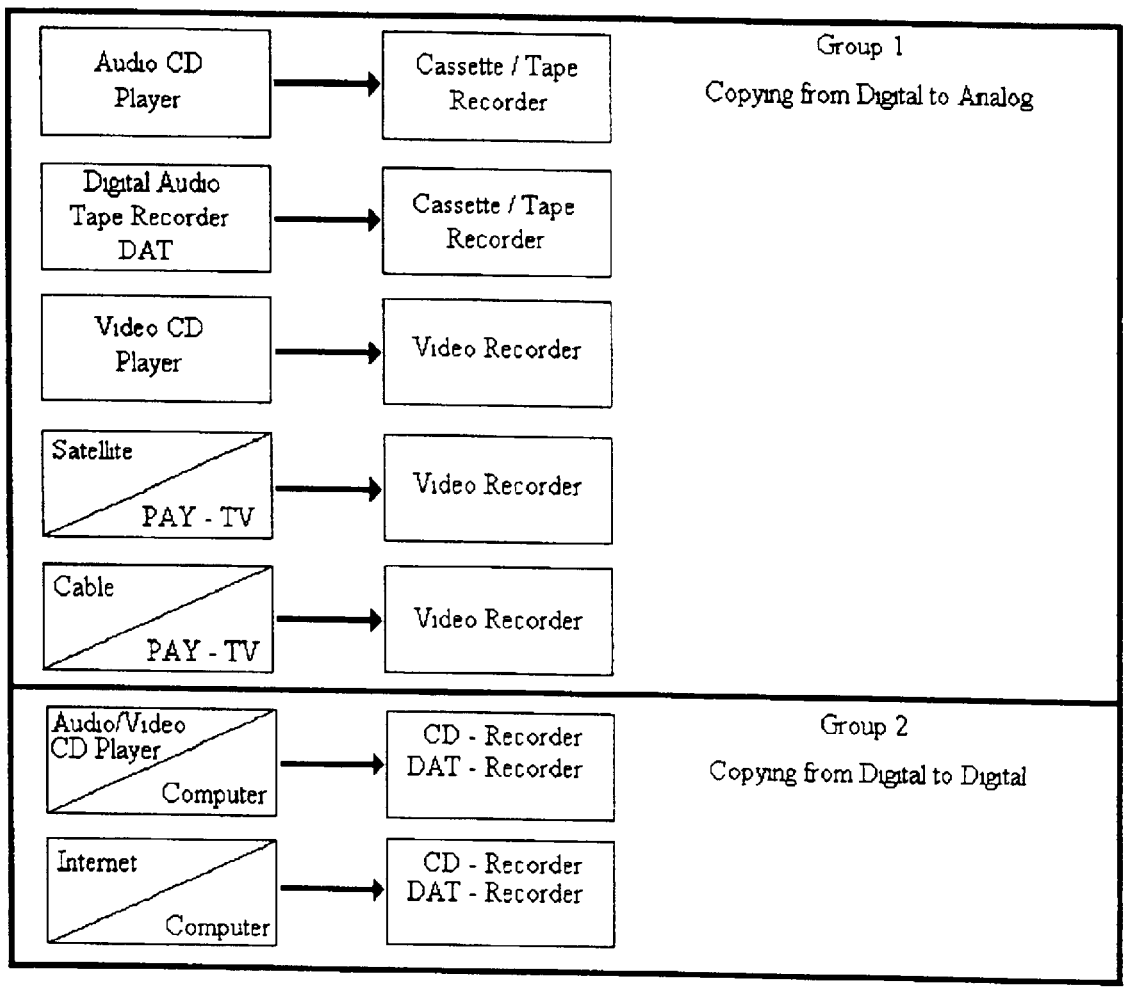
FIG. 1 schematically shows possible applications of the method of the present invention.

As shown in FIG. 1, the copying of (digital) audio signals may be considered to involve two categories or groups of copying operations:

Group 1: from digital to analog signals, and

Group 2: from digital to digital signals.

Although some of the techniques described in this document may also apply to copying from analog to analog signals (signal representations), the following discussion will focus on the copying of digital audio signals, that is audio signals registered in a digital representation (sampled audio signals represented digitally by ones and zeros).

Especially group 2 poses problems with respect to copyright, as the CD-burners and DAT-recorders normally allow perfect copies of the original signals to be made (it will be understood that so-called DAT-recorders are tape/cassette recorders which digitally register audio signals on tape).

Figure 2:
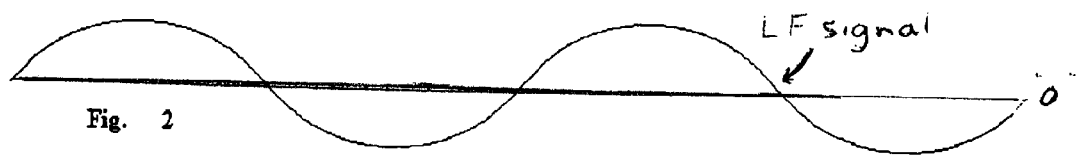
FIG. 2 schematically shows a first disturbance signal as used in the method of the present invention.

According to a first aspect of the present invention, a low-frequency disturbance signal (also called first disturbance signal) is added to an audio signal. Such a first disturbance signal is shown in FIG. 2. The signal has a frequency of approximately 2 Hz, although a range of frequencies from about 1 Hz to about 10 Hz may be used. It is only desired that the first disturbance signal is normally not audible. The amplitude of the second disturbance signal is of the same order of magnitude as the amplitude of the audio signal it is to be added to, and is preferably two or three times as large as the latter. The first disturbance signal is, like the second disturbance signal to be discussed later, preferably digitally generated.

Figure 3:
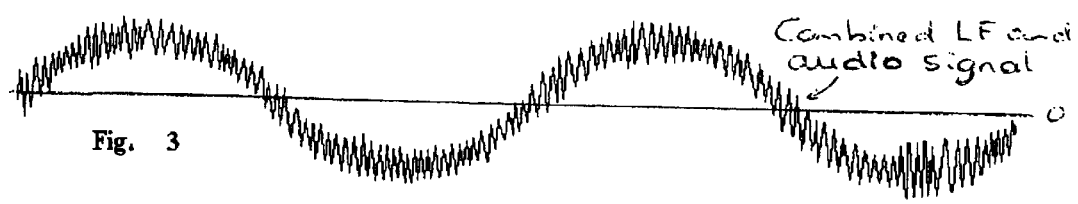
FIG. 3 schematically shows a combination of the first disturbance signal of FIG. 2 and an audio signal.
Figure 4:
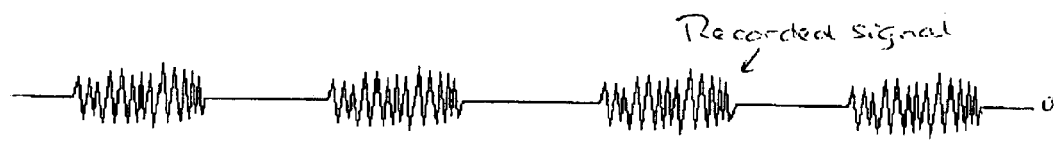
FIG. 4 schematically shows the signal of FIG. 3 as recorded on a tape recorder.

The result of the adding of the signals is shown in FIG. 3. The mixed or combined signal of FIG. 3 is obtained by producing the sum of an original audio signal and the first disturbance signal of FIG. 2. When this signal is reproduced from e.g. a CD (Compact Disc), the low-frequency modulation is not audible. However, when the combined signal of FIG. 3 is copied onto tape (regular tape or cassette), the slow "shift" results in the recorded signal (shown in FIG. 4) being regularly interrupted. This is caused by the change in signal amplitude between the peaks and troughs of the first disturbance signal, which induces an erasing effect in the recorder heads. It will be clear that the resulting signal of FIG. 4 has a very poor sound quality. The loss-less copying of the signal of FIG. 3 onto tape is thus effectively prevented by inducing a serious signal distortion.

According to a second aspect of the present invention, a second, high-frequency disturbance signal is applied to the audio signal. Preferably, as shown in FIGS. 5–9, this modulation is applied to the original audio signal through the first disturbance signal, but the second disturbance signal may also be applied independently from, or even without, the first disturbance signal.

FIG. 5 again shows the first disturbance signal of FIG. 2. This low-frequency signal is mixed with a high-frequency second disturbance signal which preferably is a sine wave. This second disturbance signal preferably has an frequency of approximately 20 kHz, but may also have a varying frequency, as will be explained later. The frequency is chosen such that the second disturbance signal, like the first disturbance signal, is normally non-audible.

Figure 5:
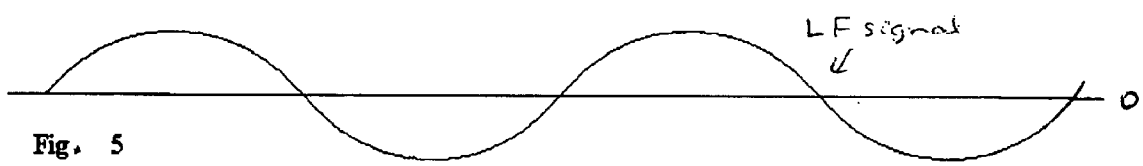
FIG. 5 schematically shows the low-frequency disturbance signal as in FIG. 2.
Figure 6:
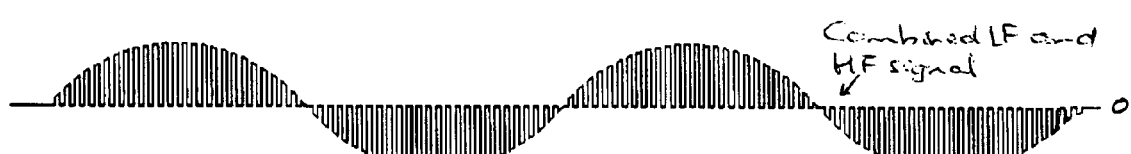
FIG. 6 schematically shows the low-frequency disturbance signal of FIG. 5, multiplied with a continuous high-frequency disturbance signal.
Figure 7:
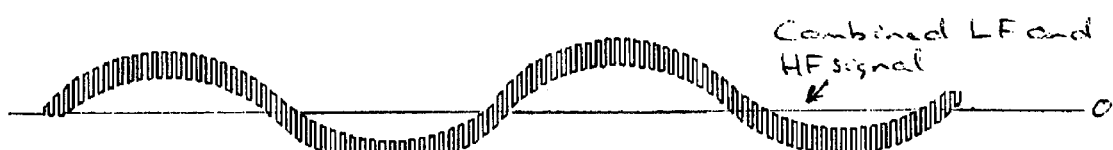
FIG. 7 schematically shows the low-frequency signal of FIGS. 5, to which a continuous high-frequency signal is added.

The signal of FIG. 6 is the resulting signal after multiplying the first disturbance signal of FIG. 5 with the second disturbance signal (product of the signal amplitudes). The signal of FIG. 7 is the resulting signal after adding the first disturbance signal of FIG. 5 to the second disturbance signal (sum of the signal amplitudes).

Figure 8:
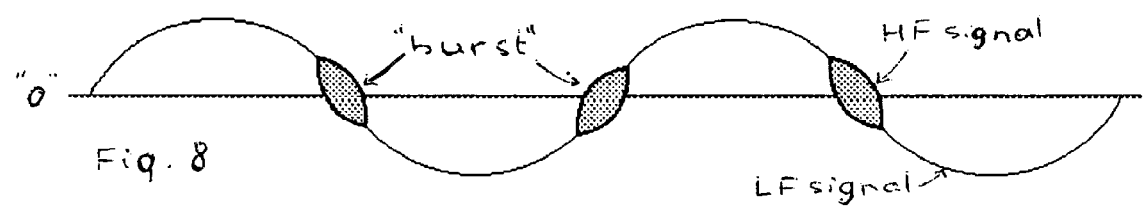
FIG. 8 schematically shows a low-frequency disturbance signal combined with high-frequency bursts.
Figure 9:
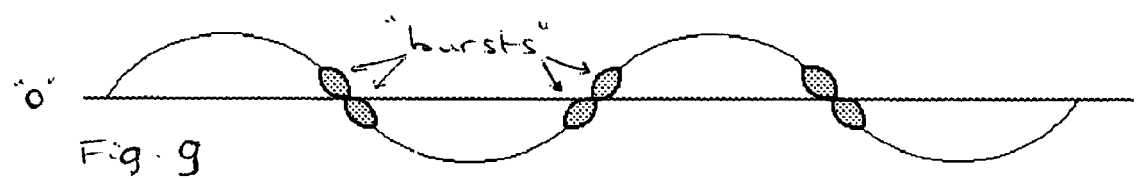
FIG. 9 schematically shows an alternative embodiment of the signal of FIG. 8.

The signal of FIG. 8 consists of a low-frequency first disturbance signal combined with bursts of a high-frequency second disturbance signal (the bursts are schematically represented in FIGS. 8 and 9 by shaded areas). These bursts preferably have a duration of about 50 to 200 ms and do preferably occur about the point where the first disturbance signal is "zero" (average signal value). By using a discontinuous second disturbance signal, instead of the continuous second disturbance signal of FIGS. 6 and 7, a first disturbance signal having a much smaller amplitude can be used to obtain identical results. Thus, using a burst-like second disturbance signal makes it possible to reduce the energy of the first disturbance signal.

The high-frequency bursts are even more effective when they occur in pairs, as schematically represented in FIG. 9. In the exemplary signal of FIG. 9, two high-frequency bursts (schematically represented as shaded areas) are located just before and just after each "zero" crossing of the low-frequency disturbance signal. It has proven less effective to locate the bursts around the peaks and troughs of the low-frequency signal. The paired bursts of FIG. 9 also allow a reduced low-frequency signal amplitude.

The heads of a tape (or cassette) recorder normally do not reproduce signals having a frequency of about 20 kHz. Feeding the signal of any of the FIGS. 6–9 to the recording head of a tape recorder will result in a partial demodulation of the high-frequency disturbance signal. This partial demodulation will lead to a distortion of the signal, thus effectively protecting the signal against copying.

Advantageously, the high-frequency second disturbance signal is frequency modulated by at least one modulating signal. Alternatively, or additionally, the second disturbance signal is amplitude modulated by the at least one modulating signal. These modulations will result in a further distortion of the (partially) demodulated signal.

The modulating signal may contain spoken messages indicative of illegal copying, such as "this is an illegal copy" or "this recording is copy protected". The modulating signal may also be derived from the original audio signal and may comprise the original signal itself or its inverse (inverted original signal). Preferably, the modulating signal contains both spoken messages, the original signal and the inverted original signal, each during a certain time period of for example 30 seconds.

In order to produce a copy-protected recording, the modulating signals may be additionally registered on the information carrier (such as a CD) or may be transmitted separately via a satellite network, internet, or the like.

The disturbance signals described above are in particular suited for the prevention of copying without quality loss to analog recorders (group 1 in FIG. 1). The (second) disturbance signal of FIG. 10 is in particular suited for the prevention of copying without quality loss to digital recorders, such as so-called CD burners.

Figure 10:
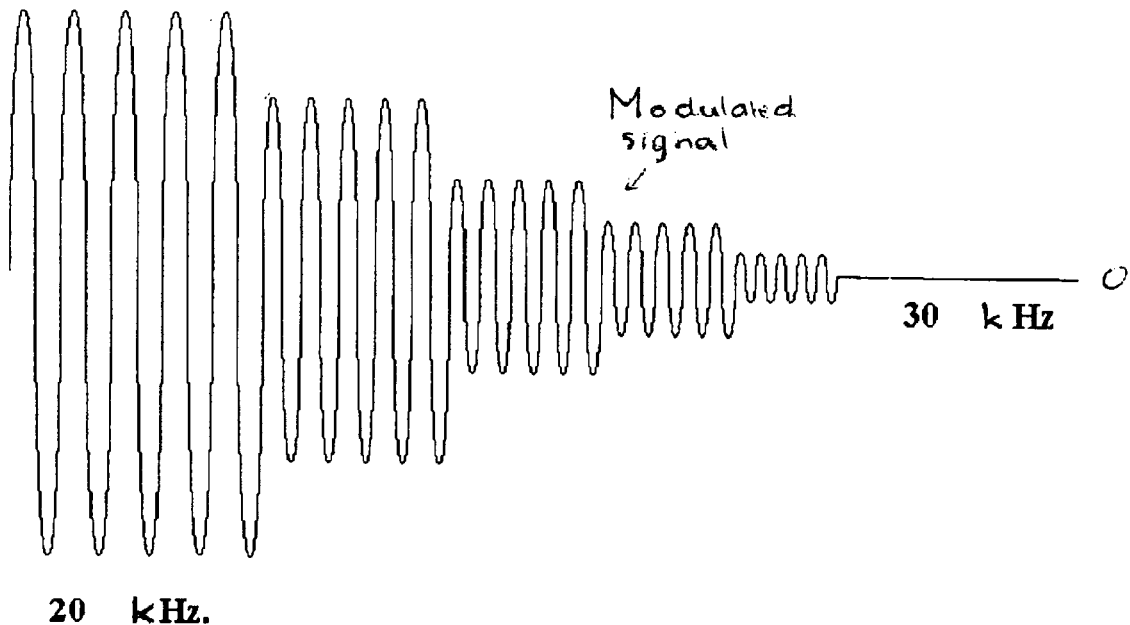
FIG. 10 schematically shows a disturbance signal which is frequency and/or amplitude modulated.
Figure 11:
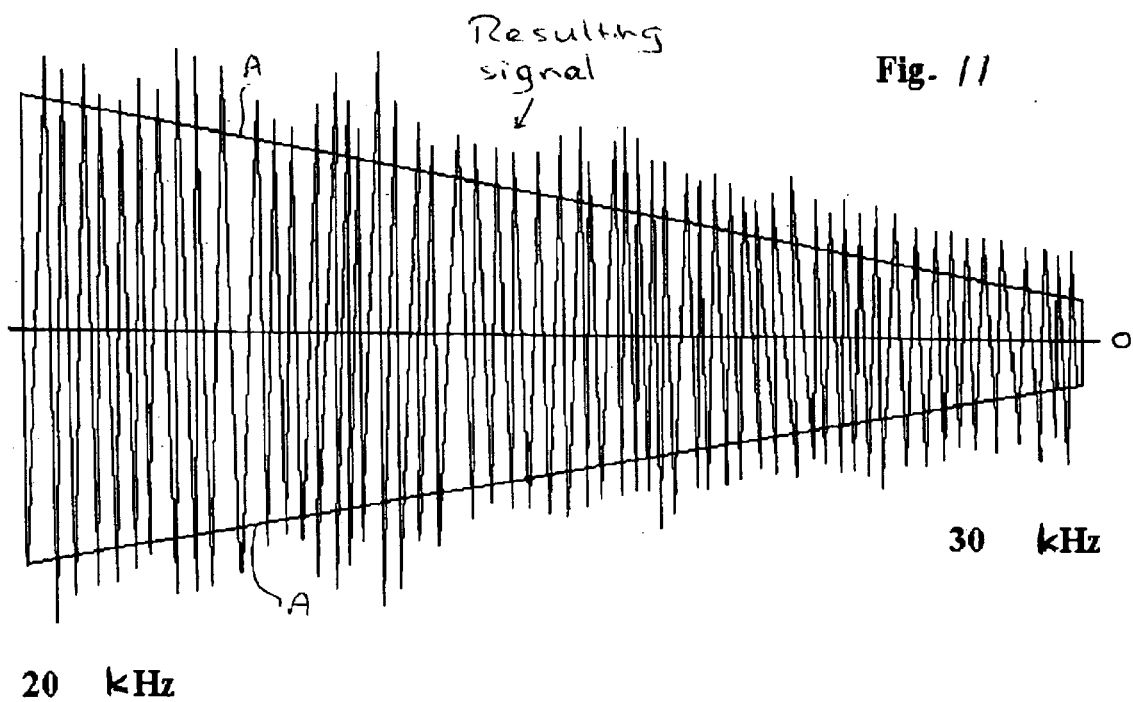
FIG. 11 schematically shows the effect of applying the disturbance signal of FIG. 10 to an audio signal.

The disturbance signal of FIG. 10 has a frequency which increases stepwise from 20 kHz to 30 kHz. As the sampling frequency used for CD recordings is about 44 kHz, the disturbance signal of FIG. 10 increases in frequency from just below half the sampling frequency (the Shannon frequency) to about three-quarters of the sampling frequency. As the frequency increases, the amplitude of the signal decreases. This type of signal proves to be highly effective in the prevention of loss-less copying. When mixed with an audio signal (by multiplying or adding), the signal of FIG. 11 results. As shown in FIG. 11, the resulting signal has a decreasing amplitude (schematically represented by the drawn lines A), effected by the modulating signal. In the signal of FIG. 11, the amplitude variations caused by the frequency sweep are clearly audible.

In addition to the frequency sweep, the same modulating signals may be used to modulate the second disturbance signals of FIG. 10 as used for the second disturbance signal of FIGS. 6–9. Thus spoken messages, the original signal and/or the inverted original signal may be used to further modulate the signal of FIG. 10.

Figure 12:
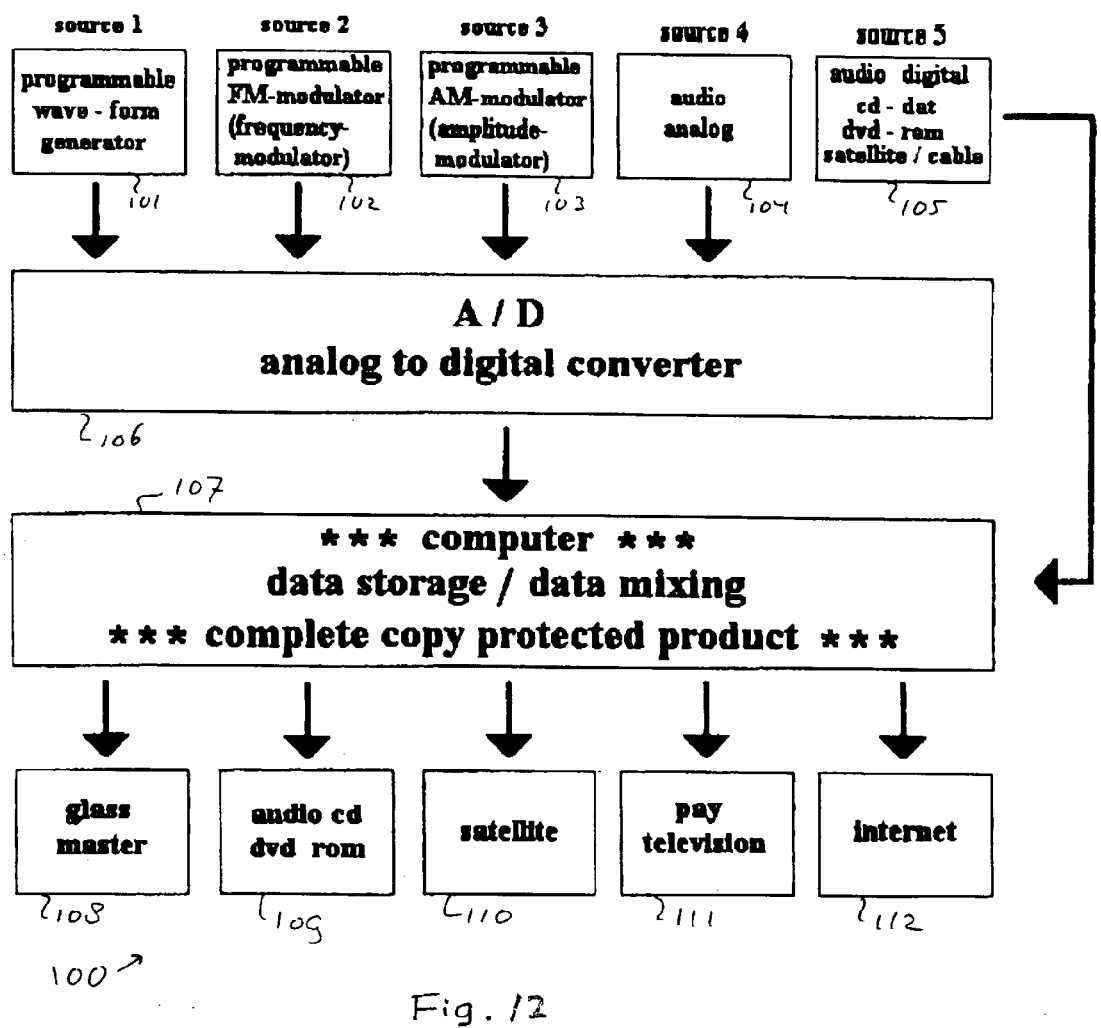
FIG. 12 schematically shows a system for carrying out the method of the present invention.

The system 100 shown by way of example in FIG. 12 is designed for copy protecting audio signals in accordance with the present invention. The system comprises signal sources 101–105, an analog to digital convertor 106, a signal processing unit (computer) 107 and signal destinations 108–112. The sources 101–104 of analog signals are connected to the signal processing unit 107 via the A/D converter 106, while the digital source 105 (e.g. a CD player) is directly connected with the signal processing unit 107.

The first source 101 is a programmable wave-form generator for producing the first and/or second disturbance signal. The second and third sources 102 and 103 are programmable FM and AM modulators respectively. The fourth source 104 is an analog audio source, e.g. for producing spoken messages.

By means of the system 100, the method of the present invention may be readily applied.

An audio signal which has been combined with the disturbance signals according to the present invention may be stored on a commercially available information carrier, such as a floppy disc having a magnetic recording medium, or a CD having an optical recording medium.

Although the invention has been described with reference to audio signals only, it will be understood that its principles can be applied to other signals as well, e.g. video signals, by mixing normally non-perceiveable disturbance signals with the original signal.

It will thus be understood by those skilled in the art that the present invention is not limited to the embodiments discussed above and that many additions and modifications are possible without departing from the scope of the present invention.

What claimed is:

1. A method for protecting an original audio signal against unauthorized recording thereof by a recorder, comprising:

combining the original audio signal with at least one inaudible disturbance signal for providing a combined signal, said combining being such that the combined signal sounds undisturbed when played and a recording of the combined signal by said recorder is disturbed, wherein the at least one inaudible disturbance signal includes a high-frequency disturbance signal which is multiplied with the original audio signal, the high-frequency disturbance signal having a frequency of approximately 20 kHz, and the original audio signal comprises a digital signal representation involving a sampling frequency, and wherein the high-frequency disturbance signal has a frequency which varies in time, preferably from approximately half to approximately three quarters of the sampling frequency.

2. A device for protecting an original audio signal against unauthorized recording thereof by a recorder, comprising:

signal generation means for generating at least one inaudible disturbance signal;

combining means for combining the original audio signal and the at least one disturbance signal and for providing a combined signal; and output means for outputting said combined signal such that the combined signal sounds undisturbed when played and recording of the combined signal by said recorder is disturbed, wherein the signal generation means generates a high-frequency disturbance signal of the at least one inaudible disturbance signal which is multiplied with the original audio signal, the high-frequency disturbance signal having a frequency of approximately 20 kHz and, the original audio signal comprises a digital signal representation involving a sampling frequency, and wherein the signal generation means generates the high-frequency disturbance signal having a frequency which varies in time, preferably from approximately half to approximately three quarters of the sampling frequency.

* * * * *